No. 891,774. PATENTED JUNE 23, 1908.
J. HUTCHINGS.
LUBRICATING MECHANISM.
APPLICATION FILED FEB. 17, 1908.
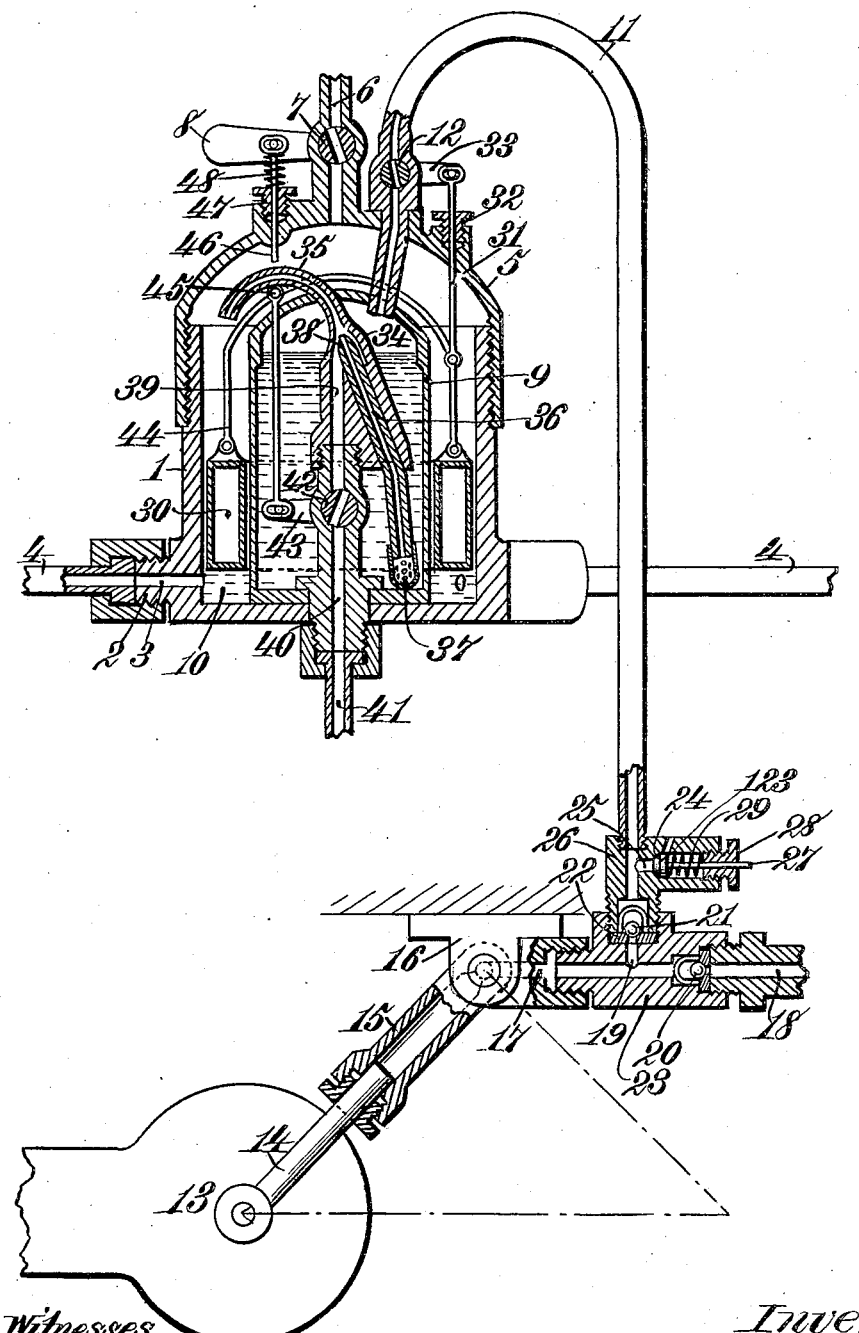
Witnesses,
Robert Everitt,
Inventor:
John Hutchings.
By James L. Norris
Atty.
THE NORRIS PETERS CO., WASHINGTON, D. C.

UNITED STATES PATENT OFFICE.

JOHN HUTCHINGS, OF LONDON, ENGLAND.

LUBRICATING MECHANISM.

No. 891,774.  Specification of Letters Patent.  Patented June 23, 1908.

Original application filed January 22, 1907, Serial No. 353,485. Divided and this application filed February 17, 1908.
Serial No. 416,336.

*To all whom it may concern:*

Be it known that I, JOHN HUTCHINGS, a subject of the King of Great Britain, residing at London, England, have invented certain new and useful Improvements in Lubricating Mechanisms, of which the following is a specification.

My present invention relates to improvements in lubricating mechanism, and more especially to mechanism of this class that is adapted for supplying a lubricant to the bearings and working parts of engines and devices of a similar nature, and it has for its object primarily to provide mechanism of this kind wherein the supply of the oil to the lubricator reservoir is controlled automatically and according to the amount of oil contained in a distributing chamber which is connected by suitable piping to the surfaces or bearings to be lubricated.

Another object of the invention is to provide an improved means for conveying the oil or lubricant from the reservoir into the distributing chamber, and a further object is to provide means for flushing or clearing the distributing pipes whenever occasion may require.

To these and other ends, the invention consists in certain improvements, and combinations and arrangements of parts, all as will be hereinafter more fully described, the novel features being pointed out particularly in the claims at the end of the specification.

The accompanying drawing is a sectional view of a lubricating mechanism constructed in accordance with the present invention.

As previously stated, lubricating mechanism constructed in accordance with the present invention is capable of being applied generally to engines and other machinery of various descriptions, and it is especially adapted for use in connection with an engine of the character covered by my prior application Serial No. 353485, filed January 22, 1907, the present application being a division of the said prior application.

The lubricator shown in the present embodiment of the invention comprises an outer casing 1 that may be of any desired form and supported in a suitable manner in proper relation to the engine or other machinery to be lubricated, the casing shown in the present instance being of substantially dome-shape comprising a cylindrical body portion having a plurality of radially extending nipples 2 thereon having discharge passages 3 that communicate with the distributing pipes 4, any suitable number of such pipes being used and they may be coupled to the casing in any suitable manner. The top of the casing is closed by a dome-shaped hood 5 that may be threaded or otherwise attached thereto. The top of the dome is provided with a vent 6 that provides a casing for a valve 7, the latter serving to control the passage of fluid through the vent and being provided with an operating handle 8, the purpose of this valve being hereinafter more fully described.

Within the outer casing is mounted an oil reservoir 9 that may be of any suitable form and construction, it being substantially closed and spaced from the inner walls of the outer casing to form an annular distributing chamber 10 into which the oil from the reservoir is discharged, and thence conducted to the distributer pipes by means of the discharge passages 3. Oil or other lubricating material is supplied to the reservoir by means of a pipe 11 which extends through the outer casing and discharges into the reservoir, and the flow of oil through this supply pipe is controlled by a valve 12. Oil is supplied to the pipe 11 by means of a pump of suitable form, it being generally preferable to operate the pump from a reciprocatory part of the engine or other machinery. In the present instance, the pump is connected to a cross-head 13 or other part which reciprocates according to the movements of the piston of the engine or other mechanism, the pump comprising a plunger 14 that is connected to the cross-head and operating in a cylinder 15, the latter being pivotally mounted on a relatively fixed bracket 16, and the cylinder alternately receives and discharges oil through a passage 17, the latter communicating with an inlet pipe 18 and also with a discharge passage 19. The pipe 18 is connected to a tank or other source of oil supply, and on the out-stroke of the plunger 14, a charge of oil is drawn into the cylinder from this inlet pipe, and on the instroke of the plunger, a check valve 20 interposed between the inlet pipe 18 and the passage 17, serves to close communication with the pipe 18 and cause the charge of oil to be discharged through the passage 19, a check valve 21 in the passage 19 serving to permit the pump to discharge oil into the pipe 11 and preventing a return flow of the said oil.

This valve 21 may be of any suitable form, that shown being arranged to coöperate with a valve seat 22 that is mounted in a casting 23. In order to relieve the pressure of oil in the pipe 11 in case the valve 12 should be closed, it is preferable to provide a relief or safety valve, that shown in the present instance comprising a valve head 123 that is adapted to coöperate with a valve seat 24 surrounding an escape passage 25 formed in a casting 26, the valve head being guided by a stem 27 operating through a plug 28, and the valve head is normally held closed or in seated position by means of a helical spring 29 which encircles the stem and is interposed between the cap 28 and the valve head.

In practice, it is generally preferable to maintain the oil in the annular distributing chamber at a substantially given level, and in order to accomplish this result, an annular float 30 is mounted to operate in the distributing chamber, the float rising and falling according to variations in the level of the oil therein, and the movements of the float are communicated to the oil controlling valve 12 by means of a member or rod 31 which extends through a stuffing box 32 formed in the outer casing and is attached to the arm 33 of the said valve, a rising movement of the float producing a corresponding movement of the rod 31 that will turn the valve operating arm 33 in a direction to close the valve 12, and conversely a falling of the float will cause a downward movement of the rod 31, and such a movement of this rod will turn the valve 12 into open position and thereby permit oil from the pipe 11 to discharge into the reservoir.

The oil or lubricant is conveyed from the central or inner reservoir to the distributing chamber by means of a discharge nozzle that comprises in the present instance a casting 34 that is arranged within the reservoir and has a discharge spout 35 which leads into the annular distributing chamber. This casting also contains an eduction tube 36, the lower end of which is submerged in the lower portion of the reservoir and provided with a rose or strainer 37 and its upper end is provided with a tapered nozzle 38, and oil is drawn from this nozzle by the suction created by a flow of compressed air through a passage 39, oil and air in a mixed state being thereby discharged from the spout 35 to the annular distributing chamber.

The compressed air is supplied to the passage 39 from a tube 40 which extends through the bottom of the reservoir and outer casing and is suitably attached to a compressed air supply pipe 41, the latter leading from a compressor or other medium that is capable of supplying compressed air preferably in a heated state. The flow of air through the tube 40 is controlled by a valve 42 having an operating arm 43, and this arm is pivotally attached to an actuating rod 44 which has an enlarged portion extending through the top of the oil reservoir.

It is preferable to also control the discharge of oil from the reservoir into the annular distributing chamber according to the level of the oil in the latter, and to accomplish this result the actuating rod 44 of the valve 42 is connected to a yoke 45 carried by or movable with the float so that as the latter rises by reason of the rise or increase in the amount of oil in the distributing chamber, the actuating rod 44 will be lifted and will thereby operate to close the valve 42 and thus interrupt the supply of compressed air to the ejector that serves to convey the oil from the reservoir into the annular distributing chamber, and on the other hand, a fall of the float will cause a depression of the actuating rod 44 that will tend to operate the valve 42, thus admitting a sufficient quantity of compressed air to effect the discharge of a sufficient quantity of oil from the reservoir into the distributing chamber.

It may be desirable in some cases to flush or clear the distributing pipes of gummy accumulations and deposits, and this may be done readily by providing the operating handle 8 of the valve 7 with a stem 46, the latter working through a stuffing box 47 in the top of the outer casing and the lower end of this rod 46 is adapted to bear upon the upper enlarged end of the actuating rod 44 of the valve 42, depression of the handle serving to close the valve 7 and thus prevent the escape of air from the distributing chamber, and the same movement of the handle 8 serves to fully open the air controlled valve 42, and the pressure thus created within the distributing chamber serves to force the oil through the distributing pipes. The handle 8 of the valve 7 is preferably returned to proper normal position by means of a spring 48.

Lubricating mechanism constructed in accordance with my present invention is capable of automatic regulation, as the valve 12 serves to control the amount of oil discharged into the inner reservoir according to the level of the oil in the annular distributing chamber, and the amount of oil discharged from the reservoir into the distributing chamber is also controlled automatically by means of the float, the rising and falling movements of the latter serving to close and open the air inlet valve 42 accordingly, and, of course, the amount of oil discharged from the reservoir is dependent upon the amount of air passing through the passage 39.

I claim as my invention—

1. A lubricator embodying an oil reservoir, distributer pipes adapted to receive oil therefrom, an oil supply pipe leading into the reservoir, means for elevating oil from the latter and conducting it to said distributer pipes and means for automatically controlling the supply of oil from the reservoir.

2. A lubricator comprising an oil reservoir, an oil supply pipe leading thereto, a distributing chamber adapted to receive oil from the said reservoir, and means controlled according to the amount of oil in the distributing chamber for regulating the supply of oil to and from the reservoir.

3. A lubricator comprising an oil reservoir, an oil supply pipe leading thereto, a distributing chamber adapted to receive oil from the reservoir, a float arranged in the distributing chamber, and valves operated automatically by the movements of the float for controlling the supply of oil to the reservoir and from the latter into the distributer chamber.

4. A lubricator comprising an oil reservoir, a supply pipe leading thereto, a valve for the supply pipe, a distributing chamber surrounding the reservoir and having distributing pipes leading therefrom, and an annular float surrounding the reservoir and arranged within the distributing chamber, and operatively connected to the said valve for controlling automatically the supply of oil in the reservoir.

5. A lubricator comprising an oil reservoir, a distributing chamber arranged on the same level therewith, means for elevating and conveying oil from the reservoir into the said chamber, and means controlled according to the amount of oil in the distributing chamber for regulating the flow of oil thereto from the reservoir.

6. A lubricator comprising an oil reservoir, a distributing chamber, pneumatically operated means for discharging oil from the reservoir into said chamber, and a device controlled according to the amount of oil in the distributing chamber for regulating said pneumatically operated means.

7. A lubricator comprising an oil reservoir, a distributing chamber, and means for conducting oil from said reservoir into the distributing chamber comprising a spout, an eduction tube submerged in the oil within the reservoir and having a nozzle thereon discharging into the spout, and means for conducting air to the nozzle of the eduction tube.

8. A lubricator comprising an oil reservoir, an oil supply pipe leading thereto, a valve in said pipe for controlling the supply of oil to the reservoir, a distributing chamber, means for conducting oil from the reservoir into said chamber, and a float mounted in the distribing chamber for controlling the supply of oil to the reservoir and the conducting of oil from the latter to the distributing chamber.

9. A lubricator comprising an outer casing having a vent therein, a valve controlling said vent, a reservoir within said casing, an air supply pipe leading to said reservoir, a valve for controlling the flow of air into the reservoir, and devices for opening the air controlling valve when the valve controlling the vent is closed.

10. A lubricator comprising a reservoir, a distributing chamber surrounding it, an oil supply pipe leading to the reservoir, a valve for controlling the supply of oil to the reservoir, a float arranged in the distributing chamber for opening and closing said valve, a continuously operating pump connected to the supply pipe, and a relief valve operable independently of said float and communicating with the supply pipe.

In testimony whereof I have hereunto set my hand in the presence of two subscribing witnesses.

JOHN HUTCHINGS.

Witnesses:
  R. W. EASTON,
  E. C. WEST.